United States Patent
DeLuca et al.

(10) Patent No.: US 9,983,769 B2
(45) Date of Patent: *May 29, 2018

(54) TRANSITIONING BROWSER TABS FROM ONE ENVIRONMENT CONTEXT TO ANOTHER

(71) Applicant: International Business Machines Corporation, Armonk, NY (US)

(72) Inventors: Lisa Seacat DeLuca, Baltimore, MD (US); Geetika T. Lakshmanan, Winchester, MA (US); Dana L. Price, Cary, NC (US); Shelbee D. Smith-Eigenbrode, Thornton, CO (US)

(73) Assignee: International Business Machines Corporation, Armnonk, NY (US)

( * ) Notice: Subject to any disclaimer, the term of this patent is extended or adjusted under 35 U.S.C. 154(b) by 285 days.

This patent is subject to a terminal disclaimer.

(21) Appl. No.: 14/835,257

(22) Filed: Aug. 25, 2015

(65) Prior Publication Data

US 2016/0170592 A1 Jun. 16, 2016

Related U.S. Application Data

(63) Continuation of application No. 14/566,241, filed on Dec. 10, 2014.

(51) Int. Cl.
*G06F 3/0483* (2013.01)
*G06F 3/0482* (2013.01)
(Continued)

(52) U.S. Cl.
CPC .......... *G06F 3/0483* (2013.01); *G06F 3/0482* (2013.01); *G06F 3/0484* (2013.01); *G06F 3/04886* (2013.01); *G06F 17/30876* (2013.01); *G06F 17/30884* (2013.01); *G06F 17/30899* (2013.01)

(58) Field of Classification Search
CPC .............. G06F 3/04843; G06F 3/0482; G06F 3/04842; G06F 3/04847
See application file for complete search history.

(56) References Cited

U.S. PATENT DOCUMENTS 8,856,675 B1 * 10/2014 Agarawala ............ G06F 3/0482
715/777
2007/0074122 A1 * 3/2007 Nichols ................... G06F 9/541
715/751

(Continued)

OTHER PUBLICATIONS

Office Action dated Apr. 6, 2017 received in parent U.S. Appl. No. 14/566,241, 21 pages.

(Continued)

*Primary Examiner* — Anil K Bhargava
(74) *Attorney, Agent, or Firm* — Scully, Scott, Murphy & Presser, P.C.; Nicholas D. Bowman, Esq.

(57) ABSTRACT

Transitioning browser tabs from one contextual environment to another contextual environment may be provided. A user interface having a set of tabs may be presented. A context may be defined for the set of tabs and stored. One or more of the tabs in the set may be changed and a new context defined for the changed tabs and stored. A plurality of such additional contexts may be defined and stored. The set of tabs may be adjusted based on a selected browser tab context.

9 Claims, 6 Drawing Sheets

(51) Int. Cl.
    *G06F 3/0484*      (2013.01)
    *G06F 3/0488*      (2013.01)
    *G06F 17/30*      (2006.01)

(56) References Cited

U.S. PATENT DOCUMENTS

| | | | | |
|---|---|---|---|---|
| 2008/0077879 | A1* | 3/2008 | Black | G06F 3/0483 715/784 |
| 2008/0177994 | A1* | 7/2008 | Mayer | G06F 9/4418 713/2 |
| 2008/0301562 | A1* | 12/2008 | Berger | G06F 17/3089 715/733 |
| 2009/0327947 | A1* | 12/2009 | Schreiner | G06F 3/0483 715/777 |
| 2010/0050103 | A1* | 2/2010 | Husoy | G06F 9/4443 715/765 |
| 2011/0131523 | A1* | 6/2011 | Grant | G06F 3/0481 715/777 |
| 2011/0131531 | A1* | 6/2011 | Russell | G06F 3/0482 715/835 |
| 2012/0131485 | A1* | 5/2012 | Svendsen | G06F 3/0483 715/769 |
| 2012/0278756 | A1* | 11/2012 | Shah | G06F 9/4443 715/790 |
| 2012/0290938 | A1* | 11/2012 | Subbarao | H04L 67/22 715/738 |
| 2014/0173497 | A1* | 6/2014 | Schreiner | G06F 3/0483 715/777 |
| 2015/0177956 | A1* | 6/2015 | Han | G06F 3/04842 715/771 |
| 2015/0301665 | A1* | 10/2015 | Kim | G06F 3/0488 345/173 |
| 2015/0346929 | A1* | 12/2015 | Karunamuni | G06F 3/0483 715/777 |

OTHER PUBLICATIONS

List of IBM Patents or Patent Applications Treated as Related dated Nov. 11, 2015, 2 pages.

Office Action dated Aug. 4, 2017 received in parent U.S. Appl. No. 14/566,241, 19 pages.

Gibby, C., "Different tab colors for different contexts", The World of Curtis Gibby—My Blog, http://www.curtisgibby.com/blog/2010/12/different-tab-colors-for-different-contexts/, posted on Thursday, Dec. 16, 2010, 4 pages.

* cited by examiner

TRANSITIONING BROWSER TABS FROM ONE ENVIRONMENT CONTEXT TO ANOTHER

FIELD

The present application relates generally to computers, and computer applications, and more particularly to browser applications and transitioning browser tabs from one environment context to another.

BACKGROUND

Current browser environments allow users to keep multiple or separate tabs open in a browser. For example, developers, testers or operators of software in performing their tasks may keep separate tabs open for a particular context, for example, each tab pertaining to different functions in that particular context. Such users may also keep entirely separate browser windows open for different contexts with each browser window including multiple tabs. Each tab or browser includes its own URLs. When an operator wholly moves from one context to another, the operator manually changes all of the browser tabs or windows, replaces the ports within the address bar of browser tabs, or reloads each of the tabs with respective bookmarked URLs.

In development and operation environments, it may be common to perform similar activities in a browser, albeit within different contexts. These activities could include visiting similar websites, test references, admin consoles, integrated development environments and/or other tools. When the context in which the browser tabs are used changes, the operator has to change all of the browser URLs to reference those particular to the new context environment.

BRIEF SUMMARY

A method and system of transitioning browser tabs from one contextual environment to another contextual environment may be provided. The method, in one aspect, may comprise presenting a user interface with a set of tabs, the set of tabs associated with a set of resource identifiers respectively. The method may also comprise detecting an indication for changing a browser tab context. The method may further comprise determining a browser tab context to switch into based on the indication. The method may further comprise adjusting the set of tabs to open a corresponding set of resource identifiers associated with the determined browser tab context on the user interface.

A system for transitioning browser tabs from one contextual environment to another contextual environment, in one aspect, may comprise a processor. A user interface may be operable to run on the processor and allow one or more users to open a set of tabs in a browser window and define a context associated with the set of tabs, the set of tabs associated with a set of resource identifiers respectively. The user interface may be further operable to receive the defined context associated with the set of tabs. A memory device may be coupled to the processor and operable to store the defined context and the set of resource identifiers associated with the set of tabs. The user interface may be further operable to allow the one or more users to change one or more of the resource identifiers of the set of tabs and define an additional context for the set of tabs with the changed one or more resource identifiers. The user interface may be further operable to detect a change on the user interface changing at least one resource identifier associated with at least one tab of the set of tabs. The user interface may be further operable to receive the additional context and associate the additional context with the set of tabs having at least one changed resource identifier. The memory device may be further operable to store the additional context and a corresponding set of resource identifiers associated with the set of tabs having at least one changed resource identifier. The user interface may be further operable to detect an indication for changing a browser tab context, and determine a browser tab context to switch into based on the indication. The user interface may be further operable to adjust the set of tabs to open a corresponding set of resource identifiers associated with the determined browser tab context on the user interface.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Techniques may be presented for automatically changing browser tabs in a user interface window from one contextual environment to another contextual environment. As part of the transition from one contextual environment to another, the browser tabs may be reloaded with pages specific to the contextual environment selected. Such techniques may be implemented in, for example, browsers, browser plugins, products with embedded and integrated browsers, and products that produce web browser content such as mobile applications.

A browser is an application program that may retrieve and present information content, for example, text, video, image and other content, and may include a graphical user interface window for presenting the information content, and also for receiving input and/or input commands from a user. A browser's graphical user interface window (also referred to as a browser window) may be enabled to display multiple tabs, each tab associated with a document or panel contained within the browser window, for example, allowing multiple views to be displayed within one browser window.

As an example, a user may use a browser and tab panels to open a set of documents or sites to use in one context. The user may then open a similar set of documents or sites but to use in different context. For instance, in a DevOps environment in which there is collaboration between development and operations teams in creating a product, similar sets of documents may be opened for a development context, test context and operational support context. Techniques of the present disclosure in one embodiment allow for automatic transition of a browser window and tab panels from one context to another context.

Figure 1:
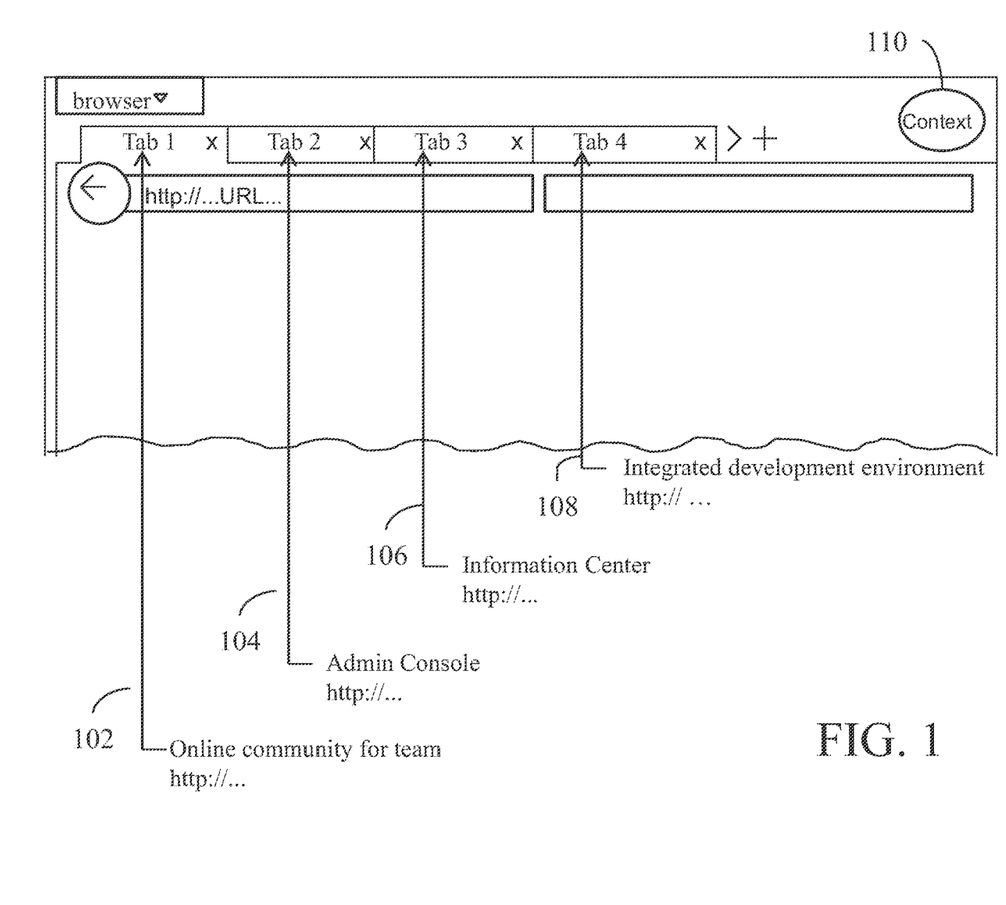
FIG. 1 shows an example browser window with tab panels implemented with a technique of the present disclosure in one embodiment.

FIG. 1 shows an example browser window with tab panels implemented with a technique of the present disclosure in one embodiment. This figure, for example, shows a browser window with open tab panels in a development context. For instance, the first tab 102 may have opened a document related to online community for development team; the second tab 104 may have opened a document related to an administrator console associated with development; the third tab 106 may have opened a document related to information center showing information associated with development; the fourth tab 108 may have opened another document representing the integrated development environment related to development context. A context button 110 or another input element allows a user to switch between different contexts.

Figure 2:
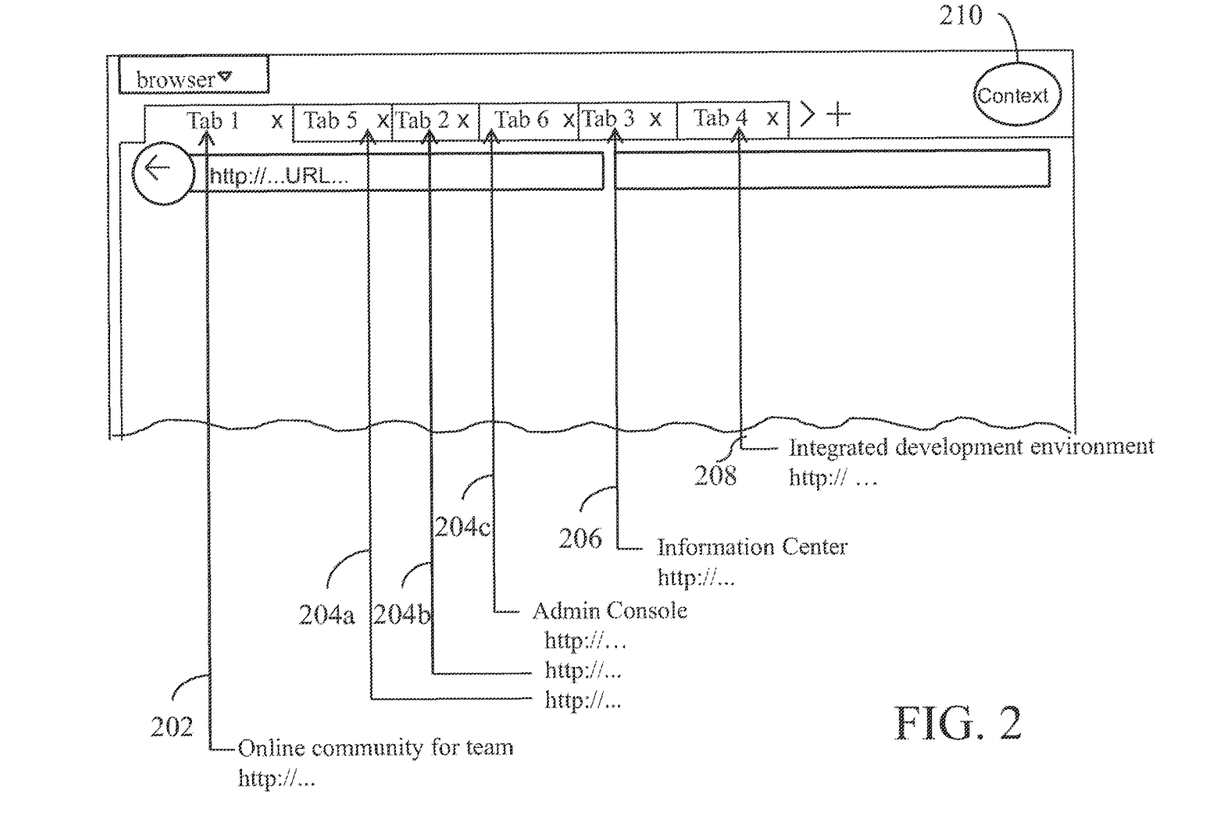
FIG. 2 shows another example browser window with tab panels implemented with a technique of the present disclosure in one embodiment.

FIG. 2 shows another example browser window with tab panels implemented with a technique of the present disclosure in one embodiment. In this example, a browser window is displayed with open tab panels (e.g., 202, 204, 206, 208) in a test context. For instance, selecting a context button (e.g., 110 in FIG. 1) from another context, e.g., development context shown in FIG. 1, may create additional tabs and switch the existing tab panels to display documents in this test context. In one embodiment, multiple admin consoles (e.g., shown at 204a, 204b, 204c) may be supported in a browser window for instance represented in separate tabs.

Figure 3:
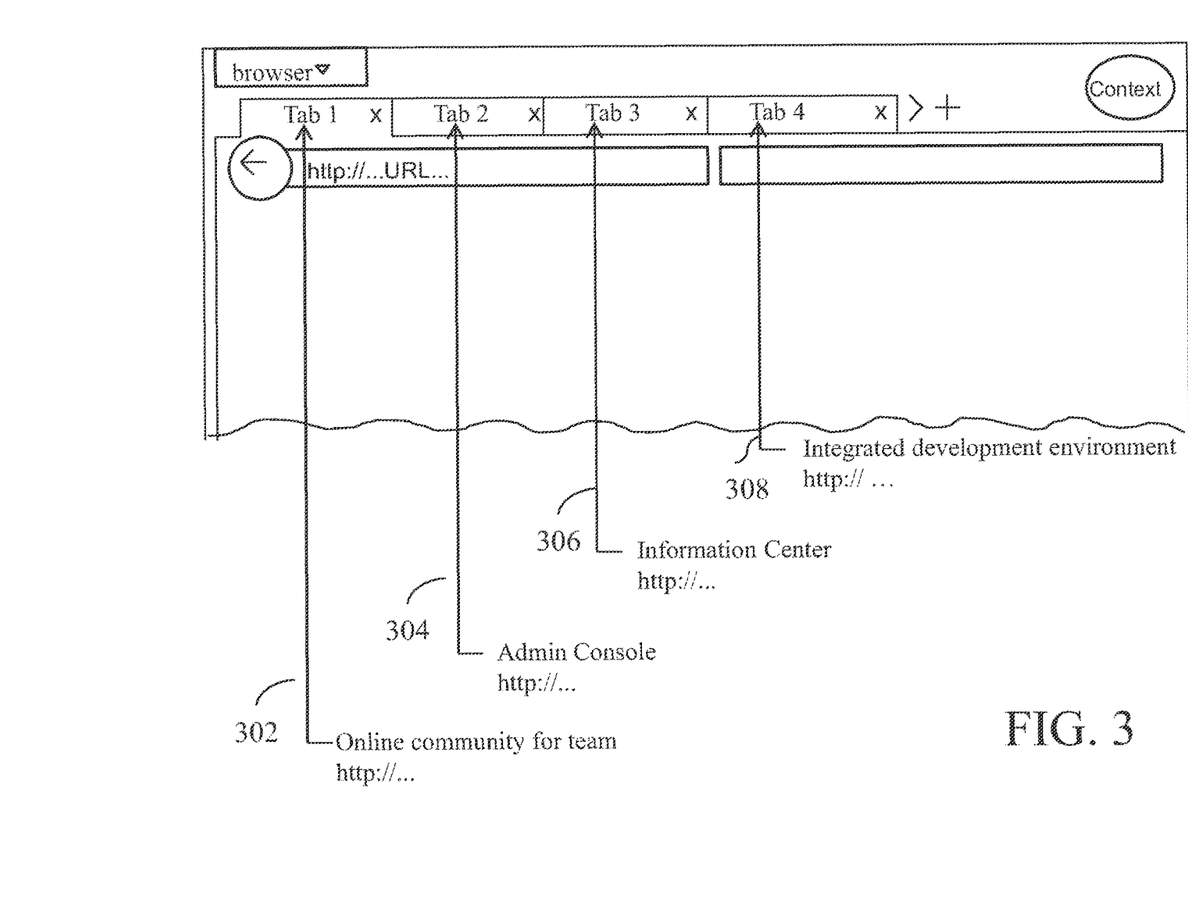
FIG. 3 shows yet another example browser window with tab panels implemented with a technique of the present disclosure in one embodiment.

FIG. 3 shows yet another example browser window with tab panels implemented with a technique of the present disclosure in one embodiment. For instance, selecting a context button (e.g., 210 in FIG. 2) from another context, e.g., test context shown in FIG. 2, may close some tabs and switch some of the existing tab panels to display documents in this test context. This example shows a browser window displayed with open tab panels (e.g., 302, 304, 306, 308) in a support context.

Figure 4:
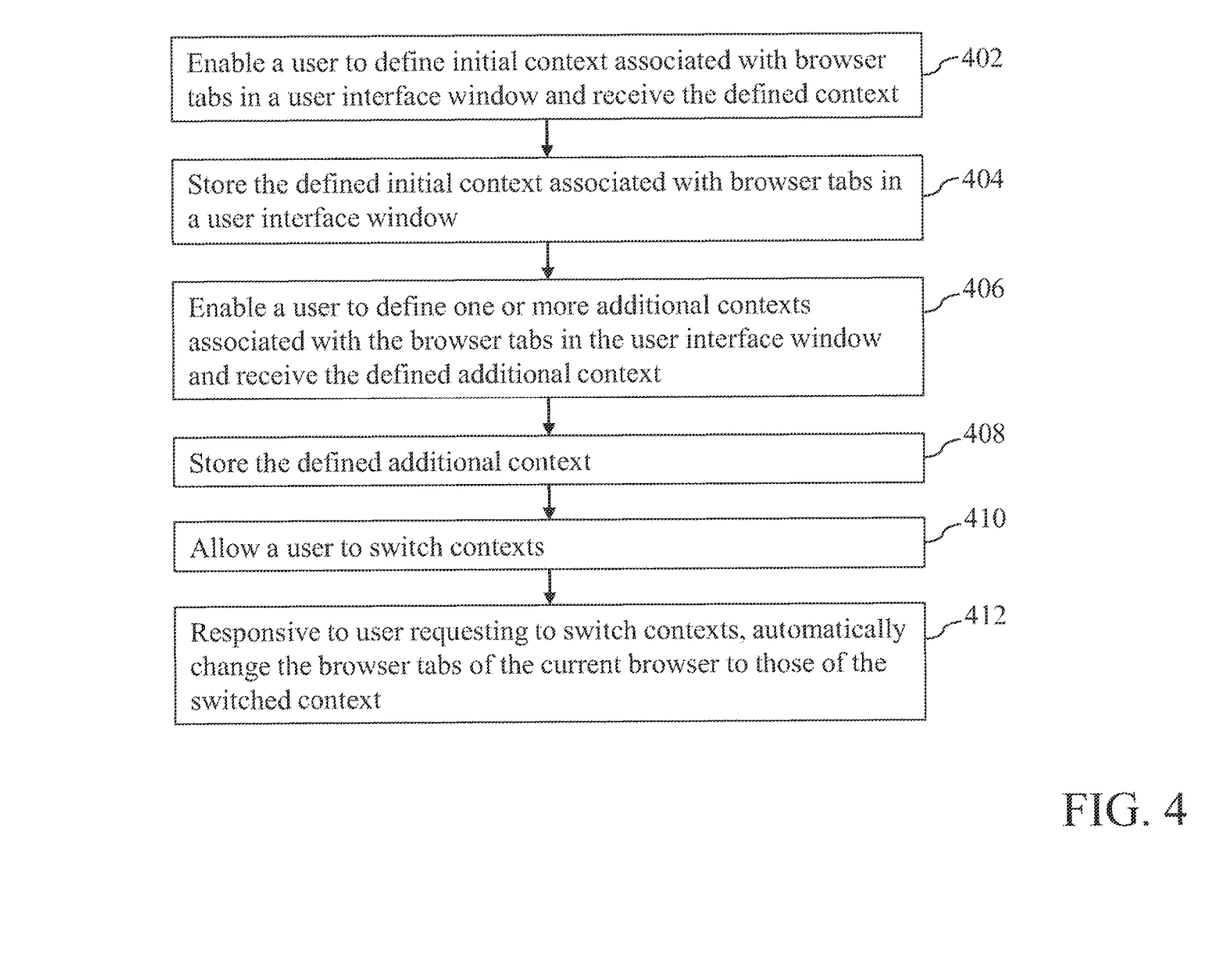
FIG. 4 is a flow diagram illustrating a method of transitioning browser tabs from one environment context to another in one embodiment of the present disclosure.

FIG. 4 is a flow diagram illustrating a method of transitioning browser tabs from one environment context to another in one embodiment of the present disclosure. At 402, a user is allowed to define an initial context. For example, a user may explicitly open multiple browser tabs and explicitly identify a list of resource identifiers such as Uniform Resource Locators (URLs) or like identification of resources to present in tab panels, for example, by typing the URL or importing the URL. For example, responsive to a user opening a browser and multiple tabs in the browser's window, a user interface may open and display the documents identified by the resource identifiers in the tab panels, e.g., within the browser window. A user interface, for example, a functionality of a browser or another application, may enable the user to input the initial context and may receive from the user the initial context and the list of resource identifiers (e.g., URLs or the like). The user interface may also allow a user to name the context, for example, by inputting the name of the context to the user interface.

At 404, the user interface may store the named context along with the tabbed resource identifiers (e.g., URLs) in this context.

At 406, a user may define an additional context. For example, the user can change one of the tab's or URL's host and/or port and apply it to the initial context, and the user interface of the present disclosure may modify automatically all initial resource identifiers (e.g., URLs) in the same way. As another example, the user can change each tab's resource identifier (e.g., URL) individually. The user interface allows a user to modify the URLs or portions (e.g., host or port portion) of the URLs of the tabs. In another aspect, the user can add new tabs to entirely different URLs, and remove some of the tabs in use. A user may be allowed to name this new context.

At 408, the user interface of the present disclosure may store the new named context. The processing at 406 and 408 may be repeated for a number of additional contexts.

At 410, the user interface allows a user to switch contexts. For example, a button, a pull-down menu or like input element may be provided on the user interface window for a user to select for switching contexts. In another aspect, the user interface may be implemented to receive gesture as input for switching contexts. The user interface may allow a user to also specify the name of the context to which the user desires to switch context.

At 412, responsive to receiving a request to context switch the browser tabs, the user interface may change the tabbed resource identifiers (e.g., URLs) to the resource identifiers (e.g., URLs) associated with the requested context. For instance, when a context switch is requested by the user, the user interface may change the current tab's resource identifiers (e.g., URLs). Additional (or fewer) browser tabs may be enabled. Resource identifiers (e.g., URLs) for the current context are loaded, and the new context is identified as the current context.

For example, in FIG. 1, the user interface shows a development environment context, where four types of browser tabs are maintained: a development team-centric URL, a product under development URL, a product under development reference URL, and a collaborative life cycle management URL. In FIG. 2, the user interface shows a test environment context, where four types of browser tabs are maintained: a test team-centric URL, three product under test URLs under 3 tabs (2 additional tabs), a product under test reference URL, and a problem reporting URL. In FIG. 3, the user interface shows a support environment context, where four types of browser tabs are maintained: a support team-centric URL, a customer-centric product URL, a customer-centric product reference URL, and a customer problem reporting URL.

By clicking one of the buttons or using another input device or mechanism in the browser window, the user can automatically switch between contexts. For example, referring to FIG. 1, selecting a context button 110 may display or present a list of stored named contexts (e.g., if there are more than one additional contexts) from which a user can select. If there is only one additional context, the user interface may automatically switch the tab panels to that context without requiring further input from the user.

In one embodiment, a method and/or system in the present disclosure may also keep track of the state of the context before the switched occurred, e.g., in which part of a particular URL document, the user was working or browsing. The state of the context may be stored with the named context and associated resource identifiers of the tabs, e.g., so that when the context is switched back in, the state it was in before the context switch may be restored. For example, the user may be switched into the same spot of the context, e.g., URL-number-1/#thispart.

Figure 5:
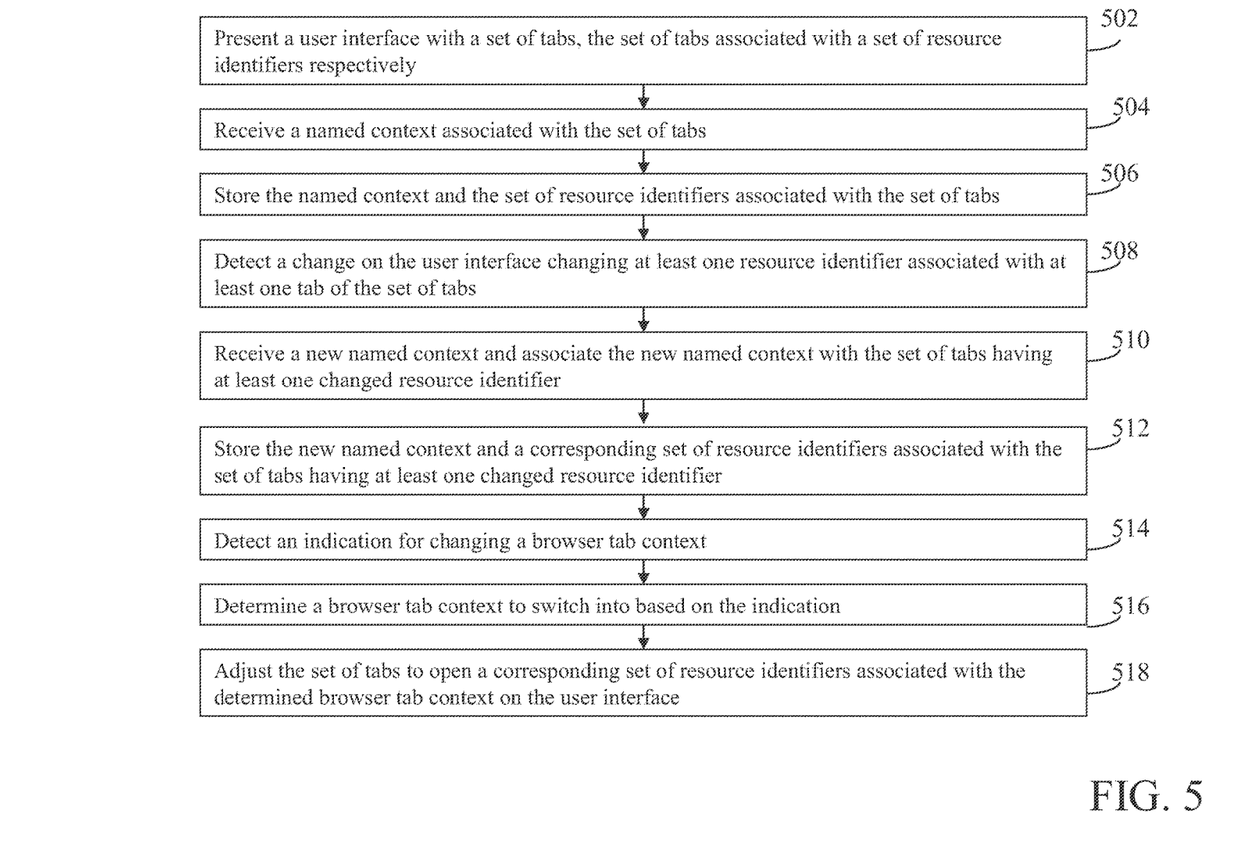
FIG. 5 is flow diagram illustrating an aspect of a method of transitioning browser tabs from one environment context to another in one embodiment of the present disclosure.

FIG. 5 is flow diagram illustrating an aspect of a method of transitioning browser tabs from one environment context to another in one embodiment of the present disclosure. At 502, a user interface with a set of tabs may be presented. For example, a user interface may run on a processor or computer and perform the presenting. The set of tabs are associated with a set of resource identifiers respectively. For example, each tab may be associated with a resource identifier such as a URL for a document or activity to be displayed or performed in the tab panel.

At 504, a named context associated with the set of tabs is received. For example, the user interface may allow a user to define a context or context name to associate with the current set of tabs having the associated current set of resource identifiers.

At 506, the named context and the set of resource identifiers associated with the set of tabs may be stored, for example, in memory and/or storage device.

At 508, the user interface may detect a change on the user interface that changes at least one resource identifier associated with at least one tab of the set of tabs. A user may adjust, update, delete and store tab elements for each tab. For example, the user interface may allow a user to change a resource identifier of a tab in the current browser tabs, delete a tab, or otherwise update one or more tabs, and define an additional context for the set of tabs, e.g., with the changed one or more resource identifiers.

At 510, the user interface may receive a new named context for the additional context and associate the new named context with the set of tabs having at least one changed resource identifier.

At 512, the new named context and a corresponding set of resource identifiers associated with the set of tabs having at least one changed resource identifier may be stored for example in memory or storage device.

At 514, the user interface may detect an indication for changing a browser tab context. For example, a selectable input element may be presented on the user interface window or display for changing the browser tab context. The indication may be detected, for example, based on a user selecting the input element for changing the browser tab context. As another example, the indication may be detected based on detecting a user with a different user role using the browser tab context. For example, if a change in a user role in using the browser tabs is indicated, the user interface may automatically switch the browser tab context to another that may be appropriate for that user role.

At 516, the user interface or another functionality or logic running on a processor may determine a browser tab context to switch into based on the indication. For example, if a user selects an input element to indicate a desire to change the current browser tab context, a menu of available browser tab contexts (e.g., stored previously) may be displayed or presented, from which a user may select. If there is only one other browser tab context, the menu need not be presented, and the browser tab context may change automatically to the one available. The browser tab context to switch into thus may be based on a user selection or may be automatically determined.

At 518, the user interface may adjust the set of tabs to open a corresponding set of resource identifiers associated with the determined browser tab context on the user interface.

In addition, a learning aspect may be introduced. For example, where the differences in contexts are more substantial (e.g., the admin console URL locations for the same configuration data change between versions), when the user switches from one context to another, the method and/or system in the present disclosure may modify the browser tab to the analogous location in different context: e.g., "URL-console-number-1/server/db/config" to "URLconsole-number-2/cell/server/config/db." For instance, a methodology in one embodiment of the present disclosure may allow a user to identify a pattern chain. As another example, a computer module implementing a methodology in one embodiment of the present disclosure may programmed to learn patterns based on aspects such as user usage patterns, contextual information (such as field titles, reference identifiers (IDs)) included between contexts. In the example shown, there is a difference in the context from one environment to the next, which may be considered minor, i.e., "/server/db/config" vs. "/server/config/db." A methodology in one embodiment may identify that the contexts are related even in the case where there are such minor differences in contexts.

A system and/or methodology of the present disclosure in one embodiment can optionally be tailored to add tabs that are specific to cloud computing tiers such as: "Infrastructure as a Service (Iaas) to Development (Dev)"/"Dev to Iaas"=>linking to the site/template used to provision new bare metal of virtual machines (VMs) for a development environment. This extension allows the user to customize tabs per environment and per function (in support of both Development and Operations type tasks). For instance, a user may be allowed to group specific tabs into the corresponding environments. For example, for Dev environment, a specific service provider and account specific URL may be needed. Similarly, for Test environment, a specific service provider and account specific URL may be needed. A user may be allowed to identify those tabs specific to and grouped within an environment context.

Techniques for transitioning browser tabs may be used to transition from one DevOps environment to another DevOps environment by changing the browser environment and reloading the browser tabs as a part of the transition. Such techniques may support contexts within massive server farms, for example, where similar or identical context roots are used across different host/port combinations. Such techniques may provide for ease and speed, e.g., of DevOps or other transitions. The techniques of the present disclosure may be combined with integrated test environments to provide context awareness and switching.

Figure 6:
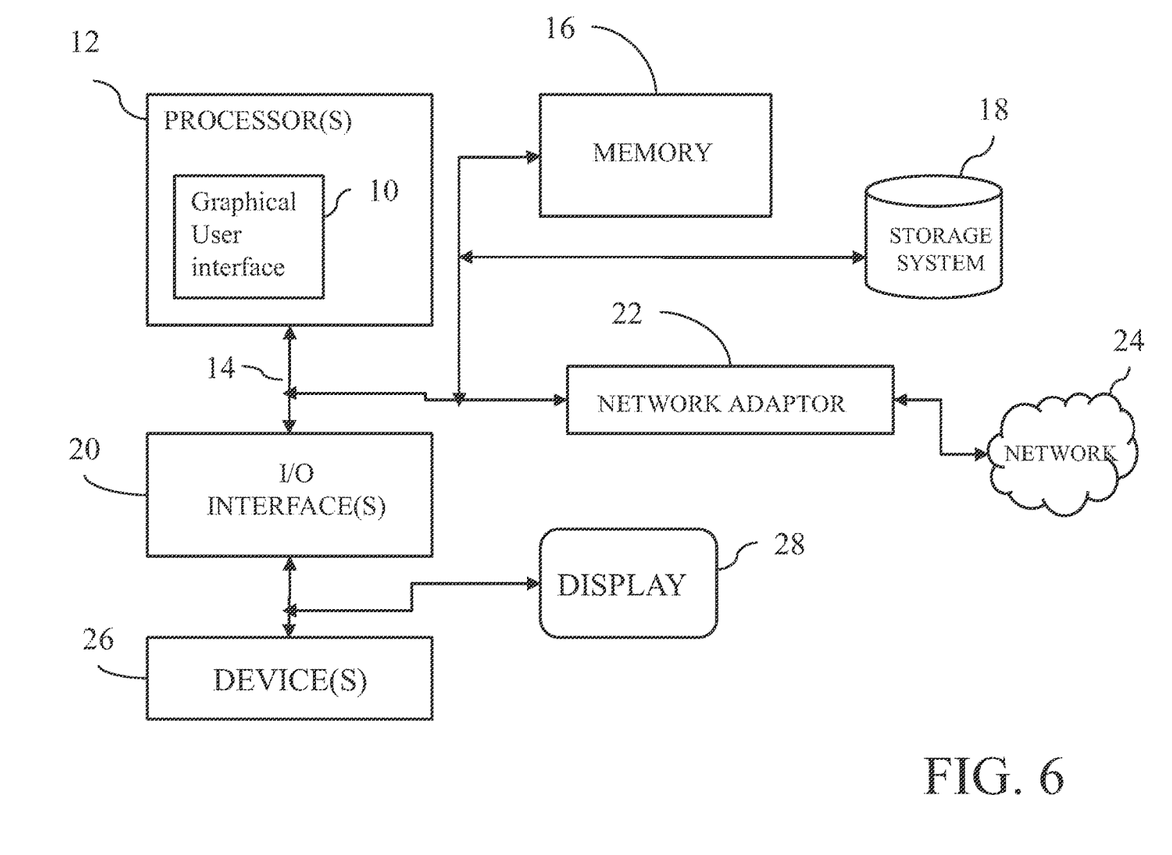
FIG. 6 illustrates a schematic of an example computer or processing system that may implement a browser transitioning system in one embodiment of the present disclosure.

FIG. 6 illustrates a schematic of an example computer or processing system that may implement a browser transitioning system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of transitioning browser tabs from one contextual environment to another contextual environment, comprising:
    presenting a user interface with a set of tabs, the set of tabs associated with a set of resource identifiers respectively;
    detecting an indication for changing a browser tab context;
    determining a browser tab context to switch into based on the indication; and
    adjusting the set of tabs to open a corresponding set of resource identifiers associated with the determined browser tab context on the user interface,
    wherein the user interface modifies at least one of the resource identifiers in the set of tabs to an analogous resource location in the determined browser tab context, wherein the analogous resource location is learned based on usage pattern responsive to detecting a location of a configuration data changing between versions.

2. The method of claim 1, further comprising:
    receiving a named context associated with the set of tabs presented on the user interface;
    storing the named context and the set of resource identifiers associated with the set of tabs;
    detecting a change on the user interface changing at least one resource identifier associated with at least one tab of the set of tabs;
    receiving a new named context and associating the new named context with the set of tabs having at least one changed resource identifier;
    storing the new named context and a corresponding set of resource identifiers associated with the set of tabs having at least one changed resource identifier.

3. The method of claim 2, wherein the detecting a change on the user interface changing at least one resource identifier associated with at least one tab of the set of tabs, the receiving a new named context and associating the new named context with the set of tabs having at least one changed resource identifier, and the storing the new named context and a corresponding set of resource identifiers associated with the set of tabs having at least one changed resource identifier, are performed multiple times for establishing multiple browser tab contexts.

4. The method of claim 2, wherein the detecting a change on the user interface changing at least one resource identifier associated with at least one tab of the set of tabs further comprises, responsive to detecting a change in one resource identifier of one tab, automatically changing rest of the tabs in the set of tabs according to the detected change in said one resource identifier.

5. The method of claim 4, wherein the detected change comprises a change in a portion of said one resource identifier.

6. The method of claim 1, further comprising:
 presenting on the user interface a selectable input element for changing the browser tab context,
 wherein the detecting an indication for changing the browser tab context comprises detecting a selection of the input element for changing the browser tab context.

7. The method of claim 6, wherein the selection of the input element triggers a presentation of a list of browser tab contexts for a user to select, and the browser tab context to switch into is determined based on a user selected browser tab context.

8. The method of claim 1, wherein the detecting an indication for changing a browser tab context comprises detecting a change in a user role using the browser tab context, and wherein the determining a browser tab context to switch into comprises determining a browser tab context to switch into based on the user role.

9. The method of claim 8, wherein the user role comprises one or more of a developer, a test, and supporter, and operator of a product.

\* \* \* \* \*